(12) United States Patent
Gu et al.

(10) Patent No.: US 12,118,705 B2
(45) Date of Patent: Oct. 15, 2024

(54) AUTOMATED OPTICAL INSPECTION METHOD, AUTOMATED OPTICAL INSPECTION SYSTEM AND STORAGE MEDIUM

(71) Applicant: GlobalWafers Co., Ltd., Hsinchu (TW)

(72) Inventors: Cheng-Wei Gu, Hsinchu (TW); Shang-Chi Wang, Hsinchu (TW); Chia-Yeh Lee, Hsinchu (TW)

(73) Assignee: GlobalWafers Co., Ltd., Hsinchu (TW)

( * ) Notice: Subject to any disclaimer, the term of this patent is extended or adjusted under 35 U.S.C. 154(b) by 397 days.

(21) Appl. No.: 17/567,905

(22) Filed: Jan. 4, 2022

(65) Prior Publication Data
US 2022/0270234 A1 Aug. 25, 2022

(30) Foreign Application Priority Data
Feb. 25, 2021 (TW) ................................. 110106620

(51) Int. Cl.
*G06K 9/00* (2022.01)
*G06N 20/00* (2019.01)
(Continued)

(52) U.S. Cl.
CPC ........... *G06T 7/0004* (2013.01); *G06N 20/00* (2019.01); *G06T 7/13* (2017.01);
(Continued)

(58) Field of Classification Search
CPC . G06T 2207/30148; G06T 2207/30141; G06T 7/0004; G06T 7/0006;
(Continued)

(56) References Cited

U.S. PATENT DOCUMENTS 11,022,566 B1 * 6/2021 Alumot .............. G01N 21/9503
2004/0235206 A1 11/2004 Kuhlmann et al.
(Continued)

FOREIGN PATENT DOCUMENTS

| CN | 108028185 | 5/2018 |
| TW | 202032115 | 9/2020 |

OTHER PUBLICATIONS

"Office Action of Taiwan Counterpart Application", issued on Apr. 11, 2022, p. 1-p. 6.

*Primary Examiner* — Atiba O Fitzpatrick
(74) *Attorney, Agent, or Firm* — JCIPRNET

(57) ABSTRACT

An automated optical inspection method, an automated optical inspection system, and a storage medium are provided. The method includes the following. An original image including first images of a target object is captured by an optical lens. An edge detection is performed on the original image to obtain an edge image including second images having an edge pattern. At least one of maximum, minimum, and average values of a pixel value in the second images is calculated. The edge image is divided into image blocks according to a unit area, and characteristic values are calculated according to the at least one of the maximum, minimum, and average values corresponding to the second images included in the image blocks. An optimal regression model is obtained by training a regression model corresponding to a defect of the target object according to the characteristic values and a data of the target object.

14 Claims, 6 Drawing Sheets

(51) Int. Cl.
*G06T 7/00* (2017.01)
*G06T 7/13* (2017.01)

(52) U.S. Cl.
CPC .............. *G06T 2207/20021* (2013.01); *G06T 2207/20081* (2013.01); *G06T 2207/30148* (2013.01)

(58) Field of Classification Search
CPC .............. G06T 7/0008; G06T 7/001; G06T 2207/30108; G06T 7/10; G06T 7/13; G06T 7/12; G06T 2207/20021; G06T 2207/20081; G06T 2207/20084; G01N 21/9501; G01N 21/9503; G01N 21/9505; G06K 9/6256; G06K 9/6257; G06K 9/6259; G06V 10/70; G06V 10/82; G06V 10/774–7796; G06N 3/02–126; G06N 20/00–20; G06F 18/214–2155; G06F 7/023; G06F 40/16
See application file for complete search history.

(56) References Cited

U.S. PATENT DOCUMENTS

| | | | |
|---|---|---|---|
| 2015/0098655 A1* | 4/2015 | Chang | G06T 7/001 382/192 |
| 2017/0177997 A1 | 6/2017 | Karlinsky et al. | |
| 2018/0108122 A1* | 4/2018 | Fukase | G06T 7/12 |
| 2020/0118263 A1 | 4/2020 | Nogami | G06T 7/62 |
| 2021/0027473 A1* | 1/2021 | Oya | G01N 21/88 |
| 2023/0012917 A1* | 1/2023 | Basistyy | G06T 7/10 |

* cited by examiner

AUTOMATED OPTICAL INSPECTION METHOD, AUTOMATED OPTICAL INSPECTION SYSTEM AND STORAGE MEDIUM

CROSS-REFERENCE TO RELATED APPLICATION

This application claims the priority benefit of Taiwanese application no. 110106620, filed on Feb. 25, 2021. The entirety of the above-mentioned patent application is hereby incorporated by reference herein and made a part of this specification.

BACKGROUND

Technical Field

The disclosure relates to a defect inspection technology. Particularly, the disclosure relates to an automated optical inspection method, an automated optical inspection system, and a storage medium.

Description of Related Art

Before leaving the factory, electronic components are generally inspected by senior visual inspectors with the naked eye to check whether defects are present in the manufactured electronic components, whether the electronic components are flat, or other determination criteria. For example, a Haze value is typically employed as an indicator of flatness in the determination of flatness of a SiC wafer. Generally speaking, the Haze value inspection is through manual determination with human eyes on the SiC wafer.

However, in the visual inspections performed by visual inspectors, erroneous determination is often caused because of their subjective judgment. Therefore, how to prevent overly subjective inspection results due to reliance on the naked eye is an issue of concern to those skilled in the art.

SUMMARY

The disclosure provides an automated optical inspection method, an automated optical inspection system, and a storage medium, capable of increasing training efficiency of a classification model and defect inspection accuracy of an optical inspection device.

An automated optical inspection method adapted for an optical inspection system. The system includes an optical lens and a processor. The method includes the following. An original image of a target object is captured by the optical lens. The original image includes a plurality of first images. An edge detection is performed on the original image to obtain an edge image having an edge pattern. The edge image includes a plurality of second images having an edge pattern. At least one of a maximum value, a minimum value, and an average value of a pixel value in the plurality of second images is calculated. The edge image is divided into a plurality of image blocks according to a unit area, and a plurality of characteristic values are calculated according to the at least one of the maximum value, the minimum value, and the average value corresponding to the plurality of second images included in the plurality of image blocks. An optimal regression model is obtained by training a regression model corresponding to a defect of the target object according to the plurality of characteristic values and a data of the target object.

In an exemplary embodiment of the disclosure, the plurality of characteristic values includes at least one of a standard deviation, a coefficient of variation, an average, a range, and a mean absolute deviation.

In an exemplary embodiment of the disclosure, the data of the target object includes an expected output, and the step of obtaining the optimal regression model by training the regression model corresponding to the defect of the target object according to the plurality of characteristic values and the data of the target object includes the following. The plurality of characteristic values and the expected output are input into the regression model as an input data to train the regression model, and a plurality of weights corresponding to the plurality of characteristic values are generated.

In an exemplary embodiment of the disclosure, the automated optical inspection method further includes the following. The plurality of characteristic values are classified according to the plurality of weights based on the regression model that is trained to generate a classification result corresponding to the plurality of characteristic values. The classification result is compared with the expected output to determine whether the classification result meets an expectation.

In an exemplary embodiment of the disclosure, the automated optical inspection method further includes the following. In response to determining that the classification result meets the expectation, the regression model that is trained is configured as the optimal regression model, and in response to determining that the classification result does not meet the expectation, the plurality of characteristic values for training the regression model are reselected, and the regression model is retrained.

In an exemplary embodiment of the disclosure, the automated optical inspection method further includes the following. A third image is classified based on the optimal regression model to generate a classification result corresponding to the third image.

An automated optical inspection system, including an optical lens and a processor. The optical lens is configured to capture an original image of a target object. The original image includes a plurality of first images. The processor is coupled to the optical lens and configured to perform an edge detection on the original image to obtain an edge image having an edge pattern, where the edge image includes a plurality of second images having an edge pattern; calculate at least one of a maximum value, a minimum value, and an average value of a pixel value in the plurality of second images; divide the edge image into a plurality of image blocks according to a unit area, and calculate a plurality of characteristic values according to the at least one of the maximum value, the minimum value, and the average value corresponding to the plurality of second images included in the plurality of image blocks; and obtain an optimal regression model by training a regression model corresponding to a defect of the target object according to the plurality of characteristic values and a data of the target object.

In an exemplary embodiment of the disclosure, the plurality of characteristic values includes at least one of a standard deviation, a coefficient of variation, an average, a range, and a mean absolute deviation.

In an exemplary embodiment of the disclosure, the data of the target object includes an expected output, and the processor is further configured to input the plurality of characteristic values and the expected output into the regression model as an input data to train the regression model, and generate a plurality of weights corresponding to the plurality of characteristic values.

In an exemplary embodiment of the disclosure, the processor is further configured to classify the plurality of characteristic values according to the plurality of weights based on the regression model that is trained to generate a classification result corresponding to the plurality of characteristic values; and compare the classification result with the expected output to determine whether the classification result meets an expectation.

In an exemplary embodiment of the disclosure, in response to determining that the classification result meets the expectation, the processor configures the regression model that is trained as the optimal regression model, and in response to determining that the classification result does not meet the expectation, the processor reselects the plurality of characteristic values for training the regression model, and retrains the regression model.

In an exemplary embodiment of the disclosure, the processor is configured to classify a third image based on the optimal regression model to generate a classification result corresponding to the third image.

In an exemplary embodiment of the disclosure, the processor is disposed in a remote server.

A non-transient computer readable storage medium records a program, and is loaded into a processor to capture an original image of a target object by an optical lens, where the original image includes a plurality of first images; perform an edge detection on the original image to obtain an edge image having an edge pattern, where the edge image includes a plurality of second images having an edge pattern; calculate at least one of a maximum value, a minimum value, and an average value of a pixel value in the plurality of second images; divide the edge image into a plurality of image blocks according to a unit area, and calculate a plurality of characteristic values according to the at least one of the maximum value, the minimum value, and the average value corresponding to the plurality of second images included in the plurality of image blocks; and obtain an optimal regression model by training a regression model corresponding to a defect of the target object according to the plurality of characteristic values and a data of the target object.

Based on the foregoing, after the image of the target object is captured by the optical lens of the automated optical inspection device, the image may be divided into the image blocks, and the classification model may be trained with the characteristic values corresponding to each image block. Accordingly, the training efficiency of the classification model can be effectively increased and the defect inspection accuracy of the optical inspection device can be increased.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
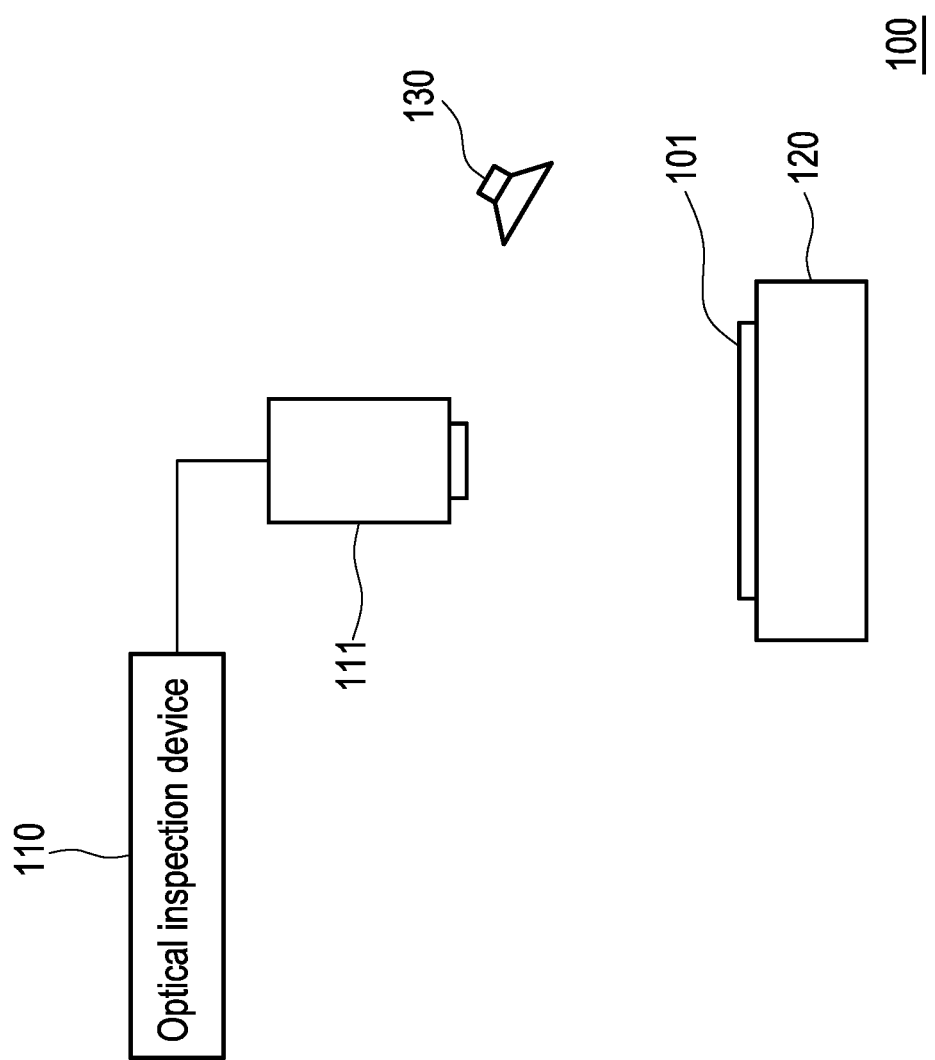
FIG. 1 is a schematic diagram of an automated optical inspection system according to an embodiment of the disclosure.
Figure 2:
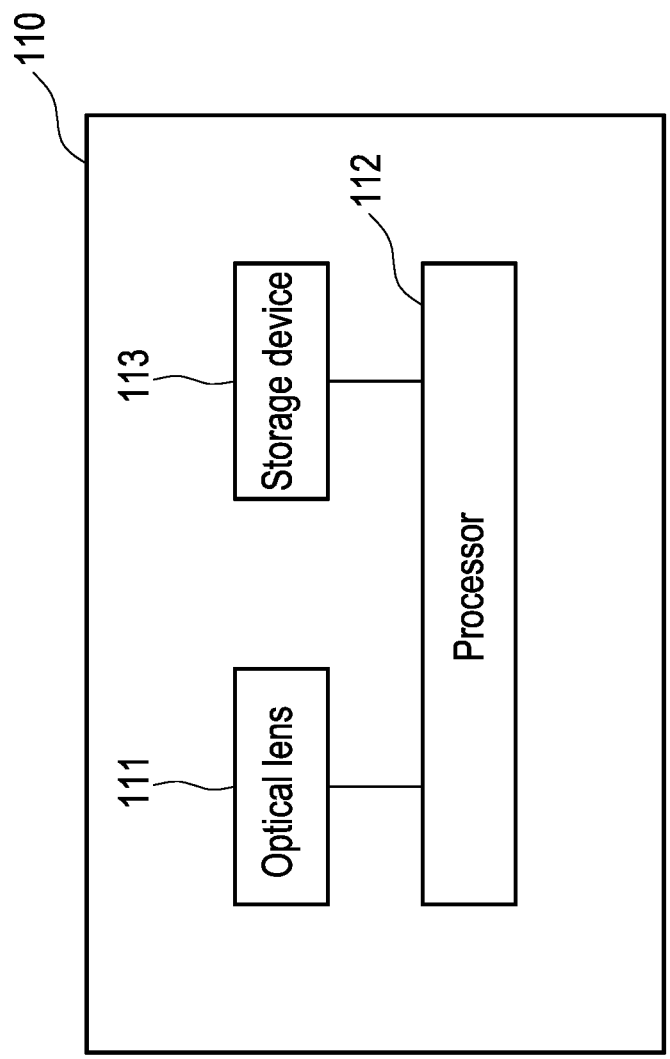
FIG. 2 is a block diagram of an automated optical inspection system according to an embodiment of the disclosure.

FIG. 1 is a schematic diagram of an automated optical inspection system according to an embodiment of the disclosure. FIG. 2 is a block diagram of an automated optical inspection system according to an embodiment of the disclosure. With reference to FIG. 1 and FIG. 2, an automated optical inspection system 100 may be applied to automated optical inspection (AOI) equipment for surface defect inspection on a target object such as a semiconductor chip, a wafer, a circuit board, and a panel. In other words, the automated optical inspection system 100 may be used to inspect defects on the surface of the target object.

The automated optical inspection system 100 may include an optical inspection device 110, a transferring device 120, and a light source device 130. In an embodiment, the optical inspection device 110 may send a control signal in a wired or wireless manner to control at least one of an optical lens 111, the transferring device 120, and the light source device 130. The optical inspection device 110 has the optical lens 111. An area scan camera and/or a line scan camera may be employed as the optical lens 111. The line scan camera is typically combined with dynamic scan inspection to photograph a target object 101 during movement. Accordingly, the continuity of the inspection process can be ensured. The transferring device 120 is configured to realize fully automated inspection. For example, the target object 101 may be transferred to an inspection region by the transferring device 120 and photographed by the optical lens 111 disposed on the side of the inspection region to capture an image of the target object 101 and perform subsequent image analysis.

The light source device 130 is configured to provide a light source for auxiliary illumination on the target object 101. The type of the light source device 130 is, for example but not limited to, a parallel light fixture, a diffuse light fixture, a dome-shaped lamp, etc. The light source device 130 may emit various types of light such as white light, red light, green light, blue light, ultraviolet light, and infrared light. In addition, with different types of the target object 101, the type of the light source device 130 may vary accordingly. It should be noted that the numbers of the optical inspection device 110, the transferring device 120, and the light source device 130 are not limited by the disclosure.

During optical inspection, it is generally possible to microscopically inspect a local defect on the target object 101 and macroscopically inspect whether or not the surface of the target object 101 is flat. Taking wafer inspection as an example, in earlier times, flatness of the wafer is checked by manual inspection after a local defect is inspected by a machine. If zebra-like line patterns, sun-like line patterns, wave-like line patterns, and other patterns are present in a wafer image, it may be determined that the wafer surface corresponding to the wafer image is not flat. However, under certain circumstances, even when a few line patterns are present in the wafer image, the wafer corresponding to the wafer image may still be determined to be non-defective. Therefore, the visual inspectors may have their own interpretation on the flatness determination criteria based on personal subjectivity, thus causing erroneous determination. As such, manual inspection tends to have lower efficiency and reliability than machine vision, and manual inspection tends to consume more time than machine vision inspection. In an embodiment, the optical inspection device 110 can automatically complete the entire inspection process, thereby increasing the inspection efficiency and reliability.

The optical inspection device 110 includes the optical lens 111, a processor 112, and a storage device 113. The optical lens 111 may include one or more optical lens. The type of the optical lens 111 is not limited by the disclosure.

The processor 112 may be, for example, a central processing unit (CPU), or any other programmable general-purpose or special-purpose micro control unit (MCU), microprocessor, digital signal processor (DSP), programmable controller, application specific integrated circuit (ASIC), graphics processing unit (GPU), arithmetic logic unit (ALU), complex programmable logic device (CPLD), field programmable gate array (FPGA), or other similar elements or a combination of the above elements. In addition, the processor 112 may also be a hardware circuit designed through a hardware description language (HDL) or any other digital circuit design familiar to those having ordinary skills in the art. The processor 112 may be responsible for the overall or partial operation of the optical inspection device 110.

The storage device 113 may include a volatile storage medium and/or a non-volatile storage medium and may be configured to store data. For example, the volatile storage medium may be random access memory (RAM), and the non-volatile storage medium may be read-only memory (ROM), solid state drive (SSD), traditional hard drive (HDD), or the like.

Figure 3:
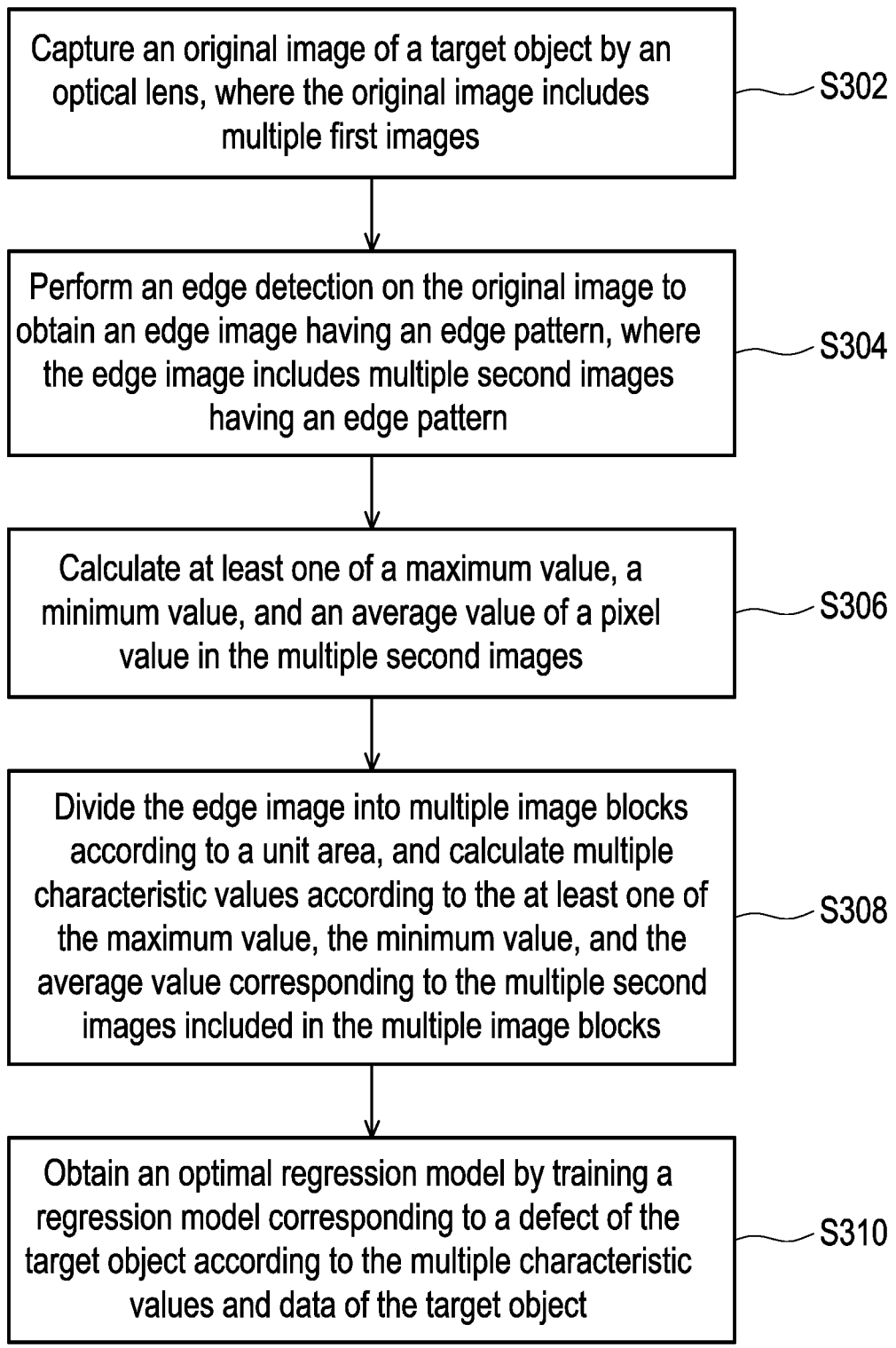
FIG. 3 is a flowchart of an automated optical inspection method according to an embodiment of the disclosure.

FIG. 3 is a flowchart of an automated optical inspection method according to an embodiment of the disclosure. With reference to FIG. 1 to FIG. 3 together, the method of this embodiment is adapted for the automated optical inspection system 100. The detailed process of the method of this embodiment accompanied with the elements of the automated optical inspection system 100 in FIG. 1 and FIG. 2 will be described below.

It should be noted that each step in FIG. 3 may be implemented as multiple programming codes or circuits, which is not limited by the disclosure. Further, the method in FIG. 3 may be used in accompany with the following exemplary embodiment, and may also be used alone, which is not limited by the disclosure.

In step S302, the processor 112 captures an original image of the target object 101 by the optical lens 111, where the original image includes a plurality of sub-images (also referred to as first images). In step S304, the processor 112 performs an edge detection on the original image to obtain an edge image having an edge pattern, where the edge image includes a plurality of edge sub-images (also referred to as second images) having an edge pattern. In other words, the processor 112 performs the edge detection on the first images to obtain the second images having the edge pattern. For example, the edge (also referred to as contour) of at least part of the patterns in the original image may be detected in the edge detection, and the detected edge may be presented in the edge image in a form of an additionally generated edge pattern. From another perspective, the processor 112 may convert the original image that does not have an edge pattern and includes the plurality of first images originally obtained by the optical lens 111 into the edge image that has the edge pattern and includes the plurality of second images. The image analysis technology employed by the processor 112 in performing the edge detection is not limited by the disclosure. In addition, the processor 112 may perform fading, singulation, or removal on other image data that does not belong to the edge pattern in the edge image to highlight the edge pattern in the edge image.

In an embodiment, the edge detection technology employed by the processor 112 is, for example but not limited to, the Sobel operator. Through the edge detection, the defective part of the image can be enhanced to increase the accuracy of the processor 112 in recognizing defective line patterns. For example, compared to a defect inspection directly performed on the original image, a defective line pattern inspection on the edge image may have higher accuracy.

In an embodiment, the processor 112 may perform other image pre-processing operations on the original image before performing the edge detection. Generally speaking, the pattern of the photographed electronic component may be presented in the plurality of first images included in the original image captured by the optical lens 111. The processor 112 may analyze the original image captured by the optical lens 111 to inspect a defect on the surface of the target object 101 through the image. For example, after the original image is captured by the optical lens 111, the processor 112 may perform image pre-processing operations (e.g., image enhancement, contrast enhancement, edge enhancement, noise removal, feature capturing, image conversion, and image compression) on the original image. In an embodiment, the processor 112 converts the original image into a Haze image by perform image pre-processing operations and then performs subsequent image analysis. Moreover, the processor 112 performs an edge detection on the original image converted into a Haze image to obtain a plurality of edge images having an edge pattern. In this embodiment, the plurality of first images included in the original image are also Haze images.

Back to the flowchart of FIG. 3, in step S306, the processor 112 calculates at least one of a maximum value, a minimum value, and an average value of a pixel value in the plurality of second images. Specifically, the processor 112 obtains a pixel value of each pixel included in the second images, and calculates at least one of the maximum value, the minimum value, and the average value of the pixel value corresponding to the second images according to the obtained pixel value of each pixel. The pixel value is a technical term familiar to those skilled in the art, including, for example but not limited to, a grayscale value, an intensity value, and the like. After calculating the maximum value, the minimum value, and/or the average value, the processor 112 generates a matrix according to the calculation result. In other words, through step S306, the second image included in the edge image is digitized into a matrix to record a value corresponding to each second image.

In step S308, the processor 112 divides the edge image into a plurality of image blocks according to a unit area, and calculates a plurality of characteristic values according to at least one of the maximum value, the minimum value, and the average value corresponding to the plurality of second images included in the plurality of image blocks. Specifically, the processor 112 may group the second images included in the edge image into the plurality of image blocks according to the unit area. In different embodiments, the size of the unit area for the image block may be determined based on the user needs. For example, the processor 112 may take a ⅕25, a ⅓36, or a ⅙64 of the area of the edge image as the unit area and divide the edge image into 5×5, 6×6, or 8×8 image blocks. Accordingly, by dividing the edge image into the plurality of image blocks for subsequent calculations, calculation of the values of the entire image at the same time, possibly diluting the maximum value or the minimum value of a single pixel, and causing erroneous determination, can be prevented.

Next, the processor 112 obtains a plurality of maximum values, a plurality of minimum values, and/or a plurality of average values corresponding to a group of second images included in each image block, and calculates a plurality of characteristic values corresponding to the group of second images according to the maximum values, the minimum values, and/or the average values. The characteristic values may include a standard deviation (Std), a coefficient of variation (Cv), an average (Ave), a range (R), a mean absolute deviation (MAD), and other statistical values. For example, the processor 112 may calculate the standard deviation, the coefficient of variation, and the average corresponding to each image block according to at least one of the maximum value, the minimum value, and/or the average value of the pixel value corresponding to the plurality of second images included in each image block. Accordingly, the plurality of characteristic values corresponding to each image block may be calculated. The characteristic values may represent a dispersion degree or a concentration degree among the plurality of second images included in the image block.

Figure 4:
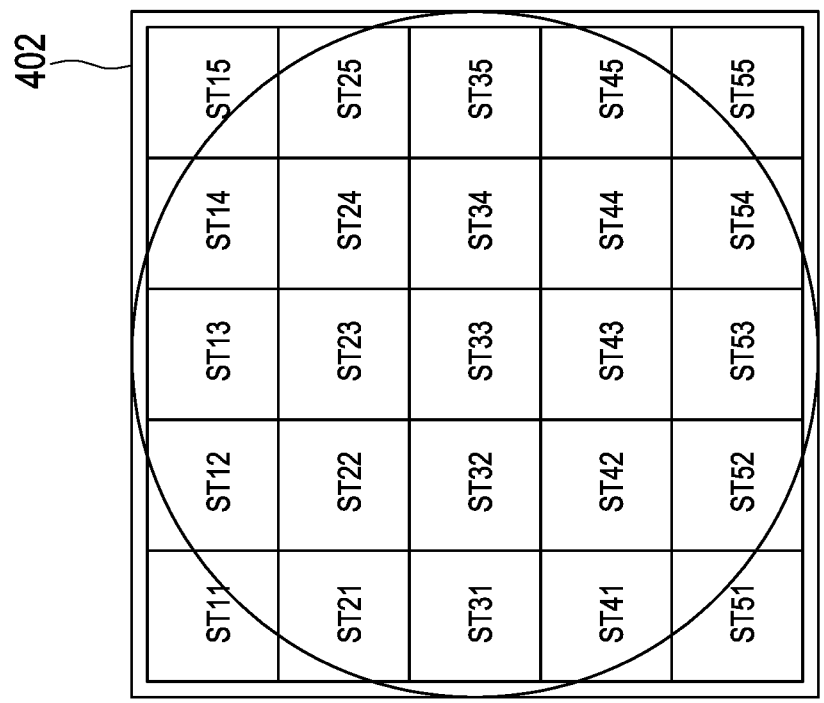
FIG. 4 is a schematic diagram of dividing an edge image according to an embodiment of the disclosure.
Figure 4:
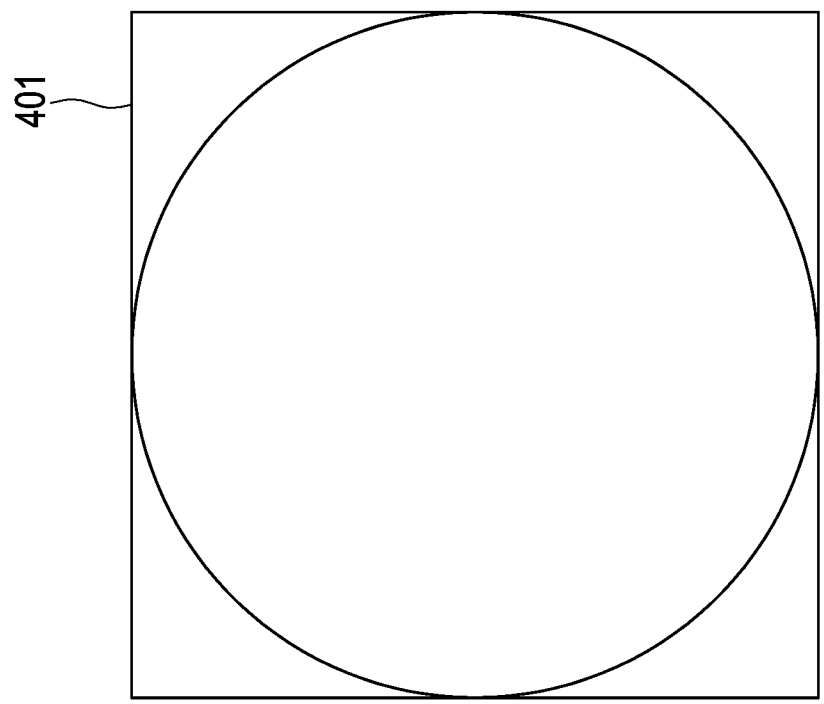

For example, taking dividing the edge image into 5×5 image blocks as an embodiment for description. In this embodiment, the grayscale value serves as an example of the pixel value. FIG. 4 is a schematic diagram of dividing an edge image according to an embodiment of the disclosure. With reference to FIG. 4, an edge image 401 includes a plurality of second images. The processor 112 obtains a pixel value of each pixel of the second images, and calculates at least one of a maximum value, a minimum value, and an average value of the grayscale value corresponding to the second images. For the calculation results of the maximum value, the minimum value, and the average value of each second image of this embodiment, reference may be made to Table 1 below.

TABLE 1

| Image block | Second image | Minimum value | Maximum value | Average value |
|---|---|---|---|---|
| ST11 | 1 | 2.95 | 7.20 | 4.26 |
|  | ... | ... | ... | ... |
|  | N | 2.93 | 7.22 | 4.25 |
| ST12 | 1 | 2.95 | 6.95 | 4.23 |
|  | ... | ... | ... | ... |
|  | N | 2.94 | 6.92 | 4.24 |
| ... | ... | ... | ... | ... |
| ST55 | 1 | 2.95 | 10.70 | 4.25 |
|  | ... | ... | ... | ... |
|  | N | 2.91 | 10.90 | 4.35 |

Figure 5:
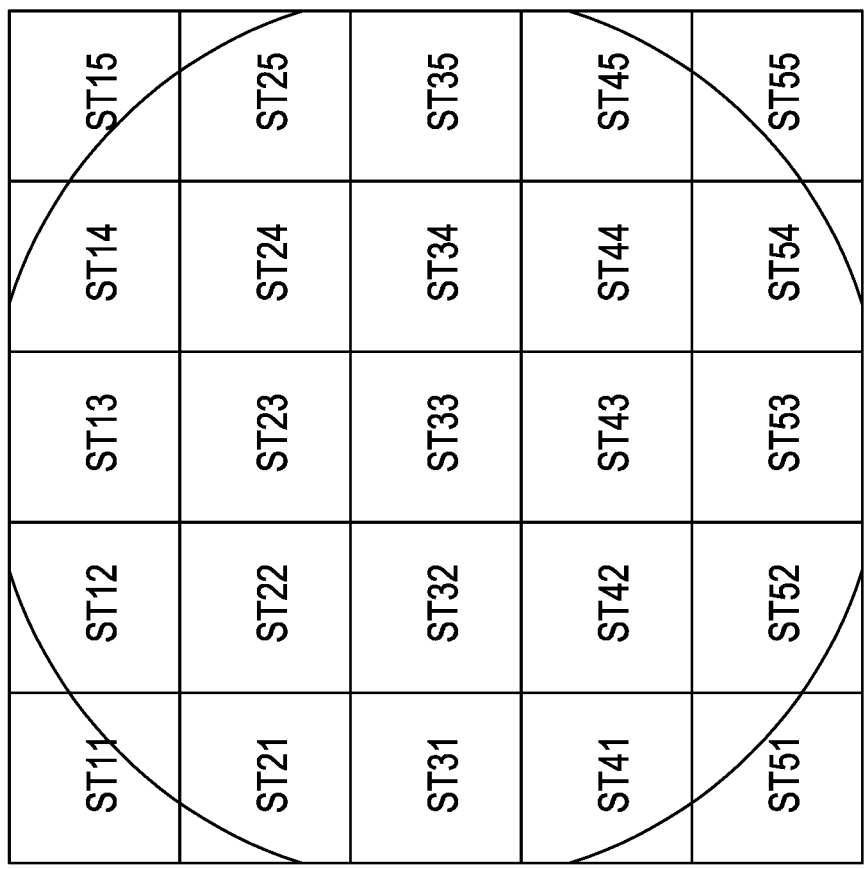
FIG. 5 is a schematic diagram of a calculation result of characteristic values according to an embodiment of the disclosure.

Moreover, the processor 112 takes a ⅕25 of the area of the edge image 401 as a unit area and divides the edge image 401 into 25 image blocks ST11 to ST55 according to the unit area, with corresponding reference to a divided edge image 402 of FIG. 4 and Table 1 above. In this embodiment, each image block includes N second images, where N is an integer greater than 0, and the value of N is determined according to the number of sub-images included when the original image is captured. Next, according to the maximum values of the grayscale values of all of the second images included in each of the image blocks ST11 to ST55 (see Table 1), the processor 112 calculates a standard deviation, a coefficient of variation, and an average of the maximum values of the grayscale values corresponding to each of the image blocks ST11 to ST55. FIG. 5 is a schematic diagram of a calculation result of characteristic values according to an embodiment of the disclosure. For the calculation result of the standard deviation, coefficient of variation, and average of the maximum value of the grayscale values of each of the image blocks ST11 to ST55, reference may be made to FIG. 5 and correspondingly to Table 2 below.

TABLE 2

| ST11 | ST12 | ST13 | ST14 | ST15 |
|---|---|---|---|---|
| Ave: 3.329 | Ave: 3.332 | Ave: 3.341 | Ave: 3.357 | Ave: 3.354 |
| Cv: 0.0144 | Cv: 0.0118 | Cv: 0.0173 | Cv: 0.0138 | Cv: 0.0174 |
| Std: 0.0043 | Std: 0.0036 | Std: 0.0052 | Std: 0.0041 | Std: 0.0052 |
| ST21 | ST22 | ST23 | ST24 | ST25 |
| Ave: 3.336 | Ave: 3.344 | Ave: 3.342 | Ave: 3.345 | Ave: 3.382 |
| Cv: 0.0117 | Cv: 0.0112 | Cv: 0.0109 | Cv: 0.0156 | Cv: 0.0764 |
| Std: 0.0035 | Std: 0.0034 | Std: 0.0033 | Std: 0.0047 | Std: 0.0226 |
| ST31 | ST32 | ST33 | ST34 | ST35 |
| Ave: 3.347 | Ave: 3.339 | Ave: 3.335 | Ave: 3.334 | Ave: 3.356 |
| Cv: 0.0162 | Cv: 0.0163 | Cv: 0.0135 | Cv: 0.0132 | Cv: 0.0783 |
| Std: 0.0048 | Std: 0.0049 | Std: 0.0041 | Std: 0.0040 | Std: 0.0233 |
| ST41 | ST42 | ST43 | ST44 | ST45 |
| Ave: 3.358 | Ave: 3.337 | Ave: 3.330 | Ave: 3.324 | Ave: 3.320 |
| Cv: 0.0200 | Cv: 0.0186 | Cv: 0.0140 | Cv: 0.0153 | Cv: 0.0165 |
| Std: 0.0060 | Std: 0.0056 | Std: 0.0042 | Std: 0.0046 | Std: 0.0050 |
| ST51 | ST52 | ST53 | ST54 | ST55 |
| Ave: 3.371 | Ave: 3.352 | Ave: 3.327 | Ave: 3.320 | Ave: 3.316 |
| Cv: 0.0098 | Cv: 0.0253 | Cv: 0.0164 | Cv: 0.0143 | Cv: 0.0203 |
| Std: 0.0029 | Std: 0.0075 | Std: 0.0049 | Std: 0.0043 | Std: 0.0061 |

In step S310, the processor 112 obtains an optimal regression model by training a regression model corresponding to a defect of a target object according to the plurality of characteristic values and a data of the target object. The original image of the target object may be determined and labeled with a determination result by an inspector in advance as an expected output of the original image. The expected output may include non-defective product, defective product, or the like. Based on the above, the data of the target object for the training may include a wafer ID and the expected output corresponding to the original image. The processor 112 may input the characteristic values corresponding to each image block (i.e., each group of second images) calculated in step S308 and the expected output into the regression model as an input data to train and generate the optimal regression model. In an embodiment, the regression model may be, for example but not limited to, a logistic regression model, a k-nearest neighbor (KNN) classification, a support vector machine (SVM), a decision tree classification, and other classification algorithm models.

Figure 6:
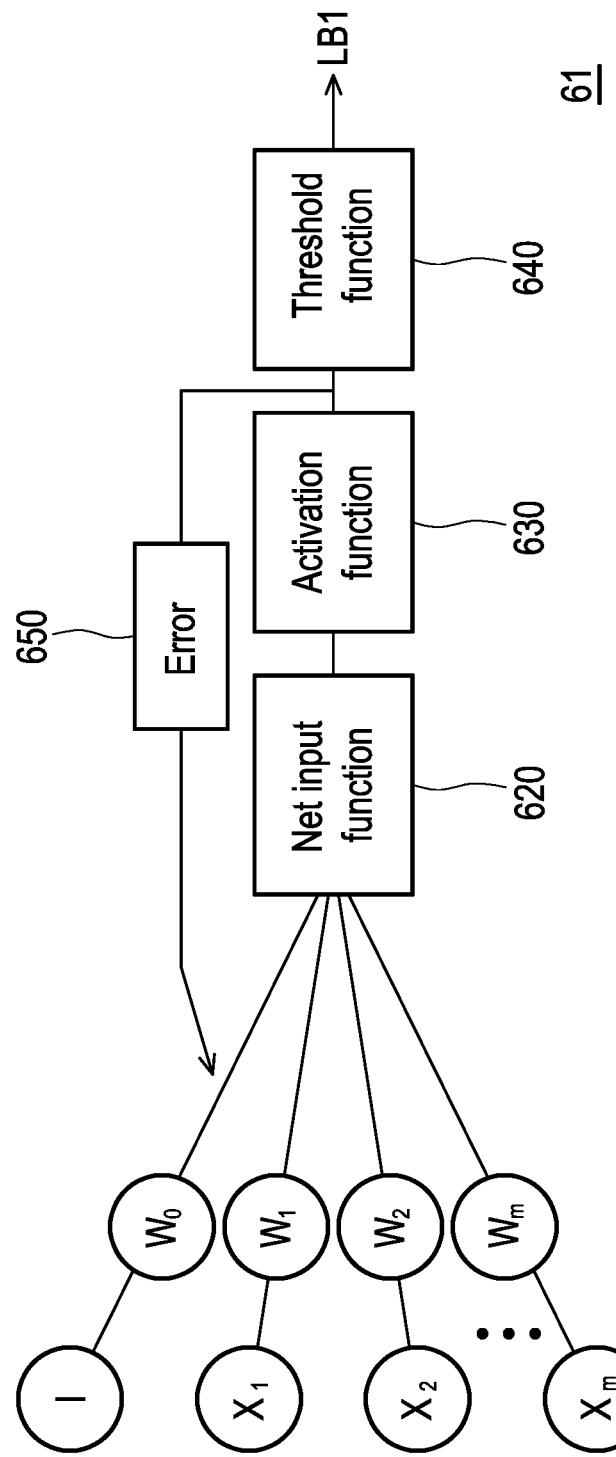
FIG. 6 is a schematic diagram of a regression model according to an embodiment of the disclosure.

FIG. 6 is a schematic diagram of a regression model according to an embodiment of the disclosure. With reference to FIG. 6, a regression model 61 may be a logistic regression model, and mainly includes a net input function 620, an activation function 630, a threshold function 640, and an error 650. The net input function 620 is for calculating a linear combination of weights and input data. The activation function 630 may be a sigmoid activation function. The error 650 may be a logarithmic loss function.

During training of the regression model 61, at least one set of input data may be input into the regression model 61. After the error is set, the weights of the input data in the net input function 620 are trained through the gradient descent or maximum likelihood. One set of input data corresponds to input values $X_1$ to $X_m$ (i.e., corresponding to characteristic values, including a standard deviation, a coefficient of variation, an average, etc. of each image block) included in one image block and an expected output I (i.e., non-defective product, defective product, or the like). After training, the regression model 61 may generate weights $W_1$ to $W_m$ of the input values $X_1$ to $X_m$ and a weight $W_0$ of the expected output I in the input data. After the regression model 61 is trained, the regression model 61 classifies at least one set of input values $X_1$ to $X_m$ according to the weights $W_0$ to $W_m$ to generate a classification result LB1 corresponding to the at least one set of input values $X_1$ to $X_m$. In other words, one classification result corresponds to one image block in one original image. The classification result LB1 may include non-defective product, defective product, or the like. In an embodiment, if the classification result LB1 of at least one of the image blocks in one original image is defective product, then the final classification result of this original image is defective product.

After the final classification result is obtained, the processor 112 may compare the final classification result with the expected output I to determine whether the final classification result meets an expectation. If the expectation is met, the trained regression model corresponding to the defect of the target object may be configured as the optimal regression model. If the expectation is not met, the processor 112 may reselect the characteristic values for training the regression model 61 and retrain the regression model 61. In an embodiment, the processor 112 may determine whether the final classification result meets an expectation by using the chi-squared test of independence. For example, the processor 112 may determine whether the association between the final classification result and the expected output I is significant by using the chi-squared test of independence, and the manner of testing is not limited by the disclosure. By repeating the above operations, the optimal regression model corresponding to the defect of the target object may be gradually trained, thereby increasing the inspection accuracy of the regression model 61 on the defect of the target object. In an embodiment, the chi-squared test of independence is, for example but not limited to, Pearson's chi-squared test.

For example, the comparison between the expected output I and the final classification result generated by the regression model 61 that is trained may be, for example, as presented in Table 3 below. The processor 112 may determine whether the association between the expected output I and the final classification result is significant by using the chi-squared test of independence.

TABLE 3

| Wafer ID | Expected output I | Final classification result | Meeting expectation or not |
| --- | --- | --- | --- |
| 1 | Non-defective | Non-defective | Yes |
| 2 | Defective | Defective | Yes |
| 3 | Non-defective | Non-defective | Yes |
| 4 | Non-defective | Defective | No |
| 5 | Defective | Defective | Yes |
| ... | ... | ... | ... |
| N | Non-defective | Non-defective | Yes |

During a defect inspection operation on an unlabeled target image (also referred to as third image) based on the optimal regression model, the processor 112 may calculate a plurality of characteristic values corresponding to each image block in the third image, and the final classification result corresponding to the third image may be generated through the operation of the activation function 630 and the threshold function 640. The final classification result may represent classification of the target object corresponding to the third image into a non-defective product, a defective product, or the like.

In another embodiment, the processor 112 may also label the image blocks determined to be defective in the third image with colors and determine defective line patterns of the third image according to the distribution of the image blocks labeled with colors to determine the type of the defect. For example, the distribution of the image blocks determined to be defective may include irregular distribution, or a regular arrangement into specific line patterns (e.g., zebra-like line patterns, sun-like line patterns, wave-like line patterns, etc.). The processor 112 may determine the type of the defect corresponding to the third image according to the distribution. In an embodiment, the defective line patterns may be determined by visual inspectors according to the distribution of the image blocks determined to be defective, or the defective line patterns may also be determined by the processor 112, which is not limited by the disclosure.

In summary of the foregoing, in the automated optical inspection method provided by the embodiments of the disclosure, by dividing the original image into the plurality of image blocks, it not only can prevent extreme values of a single pixel from being diluted, causing dot-shaped defects to be ignored, it may also be determined whether specific defective line patterns are formed in the defective image blocks by using the obtained classification result of each image block. Accordingly, by dividing the wafer image into the plurality of image blocks and classifying each image block, the method provided by the disclosure helps to macroscopically determine whether specific line patterns are present in the wafer image to check the flatness of the wafer.

In an embodiment, the regression model 61 is implemented in the optical inspection device 110. For example, the regression model 61 may be combined in a form of software, firmware, or hardware with the processor 112 of FIG. 2. Alternatively, in another embodiment, the regression model 61 is implemented in another remote server (not shown, also referred to as server network). The remote server may perform the automated optical inspection.

The optical inspection device 110 may be connected to the remote server through a wired or wireless network. In this embodiment, the remote server may include a processor and a storage device to collaborate on the operational functions required to perform the steps. In an embodiment, the optical inspection device 110 may provide the original image to the remote server through the network to perform the training in steps S304 to S310 above. The relevant specifics of operation have been described in detail above, and will not be repeatedly described herein.

The disclosure also provides a non-transitory computer readable storage medium. The non-transitory computer readable storage medium records a computer program, and the computer program is configured to perform each step of the automated optical inspection method. The computer program is composed of multiple programming code snippets (e.g., a programming code snippet for creating an organization chart, a programming code snippet for approving forms, a programming code snippet for setting, and a programming code snippet for deploying). Moreover, after being loaded into a processor and executed, the code snippets may complete the steps of the automated optical inspection method.

In summary of the foregoing, in the automated optical inspection method, the automated optical inspection system, and the storage medium provided by the embodiments of the disclosure, the defect inspection accuracy of the automated optical inspection device or the automated optical inspection system can be effectively increased. In the embodiments of the disclosure, the image is divided into the plurality of image blocks, and the classification model is trained with the characteristic values corresponding to each image block, effectively increasing the training efficiency and accuracy of the classification model. In an embodiment, in the automated optical inspection method, the automated optical inspection system, and the storage medium provided by the embodiments of the disclosure, the inspection procedure of manually macroscopically determining the wafer flatness after microscopically inspecting the wafer defect pattern may be replaced, thus increasing the inspection efficiency and reliability, and possibly also reducing the labor costs.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An automated optical inspection method adapted for an optical inspection system, the system comprising an optical lens and a processor, and the method comprising:
    capturing an original image of a target object by the optical lens, wherein the original image comprises a plurality of first images, wherein the target object is an integrated circuitry or a printed circuit board;
    performing an edge detection on the original image to obtain an edge image having an edge pattern, wherein the edge image comprises a plurality of second images having an edge pattern;
    calculating at least one of a maximum value, a minimum value, and an average value of a pixel value in the plurality of second images;
    dividing the edge image into a plurality of image blocks according to a unit area, such that each of the image blocks includes N second images, wherein N is an integer greater than 0, and a value of N is determined according to a number of the first images included when the original image is captured;
    calculating a plurality of characteristic values corresponding to each of the image blocks according to the at least one of the maximum value, the minimum value, and the average value corresponding to the N second images comprised in each of the plurality of image blocks; and
    obtaining an optimal regression model by training a regression model corresponding to a defect of the target object according to the plurality of characteristic values and a data of the target object.

2. The automated optical inspection method according to claim 1, wherein the plurality of characteristic values comprises at least one of a standard deviation, a coefficient of variation, an average, a range, and a mean absolute deviation.

3. The automated optical inspection method according to claim 1, wherein the data of the target object comprises an expected output, and the step of obtaining the optimal regression model by training the regression model corresponding to the defect of the target object according to the plurality of characteristic values and the data of the target object comprises:
    inputting the plurality of characteristic values and the expected output into the regression model as an input data to train the regression model, and generating a plurality of weights corresponding to the plurality of characteristic values.

4. The automated optical inspection method according to claim 3, further comprising:
    classifying the plurality of characteristic values according to the plurality of weights based on the regression model that is trained to generate a classification result corresponding to the plurality of characteristic values; and
    comparing the classification result with the expected output to determine whether the classification result meets an expectation.

5. The automated optical inspection method according to claim 4, further comprising:
    in response to determining that the classification result meets the expectation, configuring the regression model that is trained as the optimal regression model, and
    in response to determining that the classification result does not meet the expectation, reselecting the plurality of characteristic values for training the regression model, and retraining the regression model.

6. The automated optical inspection method according to claim 1, further comprising:
    classifying a third image based on the optimal regression model to generate a classification result corresponding to the third image.

7. An automated optical inspection system, comprising:
    an optical lens, configured to capture an original image of a target object, wherein the original image comprises a plurality of first images, wherein the target object is an integrated circuitry or a printed circuit board; and a processor, coupled to the optical lens and configured to:

perform an edge detection on the original image to obtain an edge image having an edge pattern, wherein the edge image comprises a plurality of second images having an edge pattern;

calculate at least one of a maximum value, a minimum value, and an average value of a pixel value in the plurality of second images;

divide the edge image into a plurality of image blocks according to a unit area, such that each of the image blocks includes N second images, wherein N is an integer greater than 0, and a value of N is determined according to a number of the first images included when the original image is captured;

calculate a plurality of characteristic values corresponding to each of the image blocks according to the at least one of the maximum value, the minimum value, and the average value corresponding to the N second images comprised in each of the plurality of image blocks; and obtain an optimal regression model by training a regression model corresponding to a defect of the target object according to the plurality of characteristic values and a data of the target object.

8. The automated optical inspection system according to claim 7, wherein the plurality of characteristic values comprises at least one of a standard deviation, a coefficient of variation, an average, a range, and a mean absolute deviation.

9. The automated optical inspection system according to claim 7, wherein the data of the target object comprises an expected output, and the processor is further configured to:

input the plurality of characteristic values and the expected output into the regression model as an input data to train the regression model, and generate a plurality of weights corresponding to the plurality of characteristic values.

10. The automated optical inspection system according to claim 9, wherein the processor is further configured to:

classify the plurality of characteristic values according to the plurality of weights based on the regression model that is trained to generate a classification result corresponding to the plurality of characteristic values; and compare the classification result with the expected output to determine whether the classification result meets an expectation.

11. The automated optical inspection system according to claim 10, wherein in response to determining that the classification result meets the expectation, the processor configures the regression model that is trained as the optimal regression model, and in response to determining that the classification result does not meet the expectation, the processor reselects the plurality of characteristic values for training the regression model, and retrains the regression model.

12. The automated optical inspection system according to claim 7, wherein the processor is configured to:

classify a third image based on the optimal regression model to generate a classification result corresponding to the third image.

13. The automated optical inspection system according to claim 7, wherein the processor is disposed in a remote server.

14. A non-transitory computer readable storage medium, recording a program, and being loaded into a processor to:

capture an original image of a target object by an optical lens, wherein the original image comprises a plurality of first images, wherein the target object is an integrated circuitry or a printed circuit board;

perform an edge detection on the original image to obtain an edge image having an edge pattern, wherein the edge image comprises a plurality of second images having an edge pattern;

calculate at least one of a maximum value, a minimum value, and an average value of a pixel value in the plurality of second images;

divide the edge image into a plurality of image blocks according to a unit area, such that each of the image blocks includes N second images, wherein N is an integer greater than 0, and a value of N is determined according to a number of the first images included when the original image is captured;

calculate a plurality of characteristic values corresponding to each of the image blocks according to the at least one of the maximum value, the minimum value, and the average value corresponding to the N second images comprised in each of the plurality of image blocks; and obtain an optimal regression model by training a regression model corresponding to a defect of the target object according to the plurality of characteristic values and a data of the target object.

* * * * *